United States Patent [19]
Vahabzadeh

[11] Patent Number: 5,046,177
[45] Date of Patent: Sep. 3, 1991

[54] ENGINE-CVT PERFORMANCE MODE SYSTEM

[75] Inventor: Hamid Vahabzadeh, Rochester, Mich.

[73] Assignee: General Motors Corporation, Detroit, Mich.

[21] Appl. No.: 531,675

[22] Filed: Jun. 1, 1990

[51] Int. Cl.$^5$ .............................................. B60K 41/18
[52] U.S. Cl. .................................. 364/424.1; 704/866
[58] Field of Search ........................ 74/866; 364/424.1

[56] References Cited

U.S. PATENT DOCUMENTS

| | | | |
|---|---|---|---|
| 3,324,740 | 6/1967 | Lewis et al. | 74/472 |
| 4,383,456 | 5/1983 | Ganoung | 74/866 |
| 4,458,560 | 7/1984 | Frank et al. | 74/857 |
| 4,459,878 | 7/1984 | Frank | 74/857 |
| 4,509,125 | 4/1985 | Fattic et al. | 364/424.1 |
| 4,546,673 | 10/1985 | Shigematsu et al. | 74/866 |
| 4,572,031 | 2/1986 | Yokooku et al. | 74/866 |
| 4,593,581 | 6/1986 | Omitsu | 74/866 |
| 4,601,680 | 7/1986 | Tokoro et al. | 474/11 |
| 4,637,280 | 1/1987 | Oshiage | 74/866 |
| 4,644,820 | 2/1987 | Macey et al. | 74/689 |
| 4,682,518 | 7/1987 | Takada et al. | 74/867 |
| 4,699,025 | 10/1987 | Omitsu | 74/866 |
| 4,700,590 | 10/1987 | Omitsu | 74/866 |
| 4,710,879 | 12/1987 | Vahabzadeh | 364/424.1 |
| 4,716,790 | 1/1988 | Sawada et al. | 364/424.1 X |
| 4,747,325 | 5/1988 | Morimoto | 364/424.1 X |
| 4,782,934 | 11/1988 | Takano et al. | 192/0.073 |
| 4,803,900 | 2/1989 | Ohkumo | 74/866 |
| 4,875,892 | 10/1987 | Sueda | 74/865 |

OTHER PUBLICATIONS

Ironside, J. M. and Stubbs, P. W. R., "Microcomputer Control of an Automotive Perbury Transmission", 0200/81 Proc. of 3rd Intl. Conference on Automotive Electronics, Mechanical Engineering Publication, 1981.
Stubbs, P. W. R. "The Development of a Perbury Traction Transmission for Motor Car Applications", ASME Paper No. 80 C2/DET 59, Aug. 1980.

*Primary Examiner*—Parshotham S. Lall
*Assistant Examiner*—Thomas S. Auchterlonie
*Attorney, Agent, or Firm*—Mark A. Navarre

[57] ABSTRACT

An improved controller for an engine-CVT drivetrain provides increased performance of the vehicle during periods of desired acceleration by controlling the engine throttle to provide greater torque during periods of acceleration without a large sacrifice to fuel economy.

10 Claims, 4 Drawing Sheets

ENGINE-CVT PERFORMANCE MODE SYSTEM

This invention relates to a mode of controlling an engine-CVT drivetrain for improved performance and is described in copending U.S. patent application Ser. No. 531,676, filed June 1, 1990, assigned to the assignee of the present invention.

BACKGROUND OF THE INVENTION

Continuously variable transmissions (CVT's) are transmissions that change gear continuously, not in discrete intervals. This continuous nature of CVT's gives them an infinite number of gear ratios, making them very attractive for automotive use. One attractive aspect is that higher efficiency of the engine may result because the engine can be run at a desired speed for a broad range of vehicle speeds, allowing an efficient engine operating point for the specific power requirement.

The control of an engine-CVT drivetrain should take into account the desired drivetrain fuel efficiency as well as the desired drivetrain performance. Prior drivetrain controls have either provided improved fuel efficiency at the expense of performance or improved performance at the expense of fuel efficiency.

SUMMARY OF THE PRESENT INVENTION

The present invention is directed to an improved engine-CVT drivetrain control which provides improved performance during periods of increased power demand (which occur during periods of vehicle acceleration and driving up inclines) without unduly compromising fuel efficiency during steady state power periods (when there is no increased power demand) of vehicle operation.

In the preferred embodiment of the invention, the engine throttle and CVT speed ratio during steady state power periods of the vehicle are controlled in response to operator power demand such that the engine runs at ideal throttle and speed values defined by an optimum efficiency throttle vs. speed relationship referred to herein as the ideal operating line. However, when operator power demand indicates that the ideal throttle value is insufficient to achieve the corresponding engine torque level, the control establishes an acceleration period in which the engine throttle is immediately opened to a position for achieving that torque level, limited by the wide-open, or maximum, position of the throttle. In this way, the transient performance of the engine-CVT drivetrain is optimized during vehicle acceleration and/or periods of increased power output, and the engine is returned to its high efficiency performance line after each such transient period.

According to another aspect of this invention, the operator can select an economy mode in which the engine throttle during periods of increased power demand is positioned to the point on the ideal operating line which achieves the operator power demand. In this mode, a longer period of time is required to reach the new power demand, but the deviation from the ideal operating line, and hence the fuel economy penalty, is not as great.

DETAILED DESCRIPTION OF THE INVENTION

Figure 1:
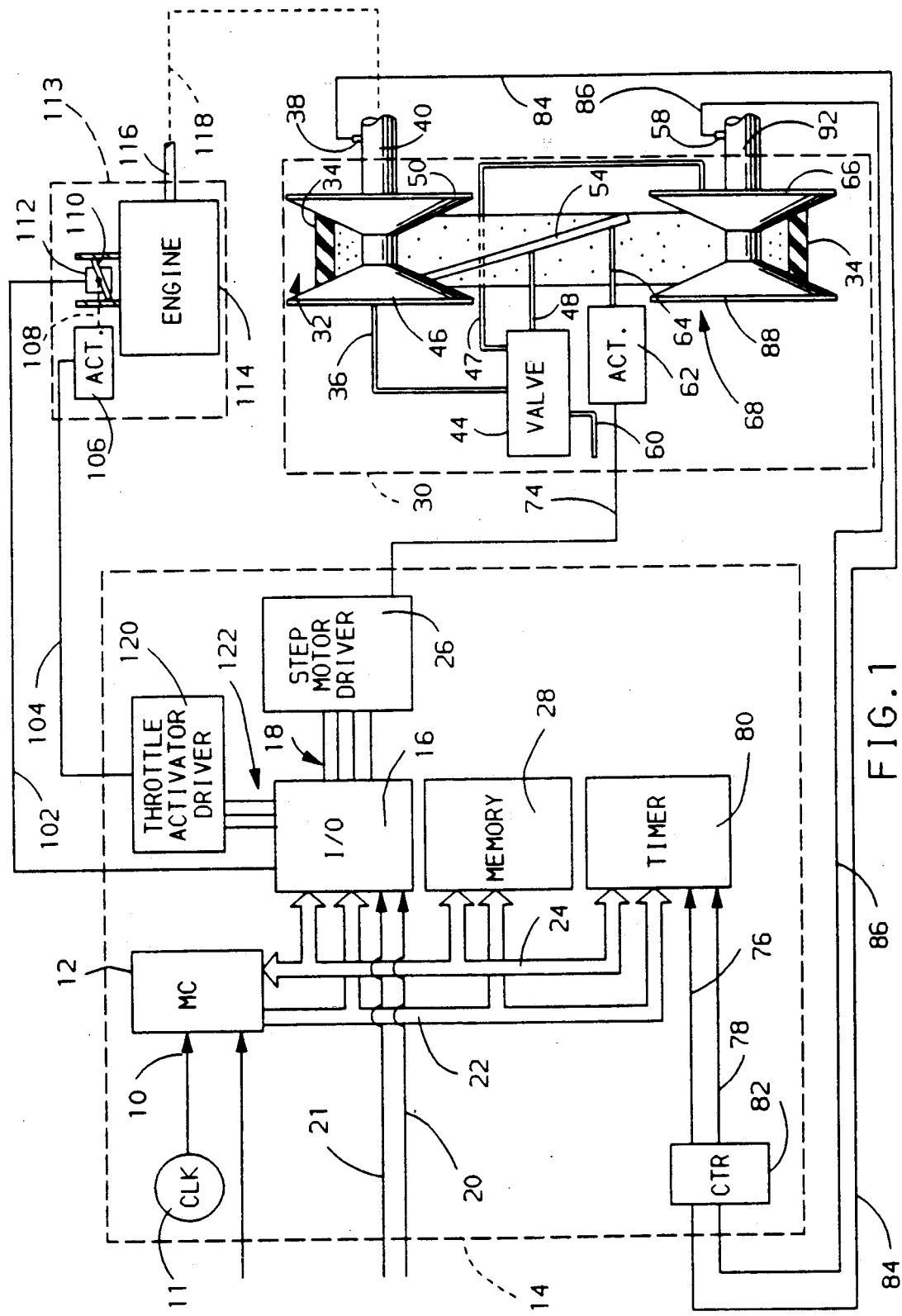
FIG. 1 is a hardware drawing showing the relationship between the controller, the CVT, and the engine.

Referring to FIG. 1, the control unit 14 controls the CVT 30 and the engine power plant 113. The control unit includes clock 11, microcomputer 12, input/output unit 16, stepper motor drivers 26 and 120, memory unit 28, timer 80, and counter 82. The engine power plant includes actuator 106, throttle 110, throttle position sensor 112, engine 114, and the engine output shaft 116. The CVT includes input pulley 32, output pulley 68, actuator 62, pressure control valve 44, V-belt 34, and input and output shafts 40 and 92. It will be understood that the present invention is not limited to the use of CVT's with pulley/V-belt power transfer. The present invention is operational with any other type of CVT, including hydrostatic and friction CVT's.

In the control unit 14, the clock 11 provides operational clock pulses to the microcomputer 12 through line 10. The microcomputer 12 controls the in/out unit 16, the memory unit 28, and the timer 80 through control bus 22. Bi-directional data bus 24 provides for the transfer of data between the in/out unit 16, the memory unit 28, the timer unit 80, and the microcomputer 12. Line 20 carries a signal representing the operator's desired shift (e.g., Park Neutral, Drive), and line 21 carries a signal representing the operator's desired mode of operation of the CVT, e.g., economy or performance. As will be explained below, the preferred implementation of the present invention includes different modes of operation of the vehicle for purposes of economy.

The input/output unit 16 controls throttle actuator driver 120 (preferably a stepper motor driver) through control lines designated generally by the number 122. The throttle actuator driver 120 provides a signal to the power plant 113 though line 104. The input/output unit 16 also controls stepper motor driver 26 through control lines designated generally as 18. The stepper motor driver 26 provides a signal to the CVT 30 through line 74.

In the power plant 113, the actuator 106, preferably a stepper motor, receives the control signal through line 104. The actuator controls the position of the throttle 110 through the actuator shaft represented by dotted line 108. The throttle controls the torque and power output of the engine 114. The throttle position is sensed by position sensor 112 and input into the controller 14 through line 102. The output power of the engine 114 is transmitted through the output shaft 116 which is connected to the input shaft 40 of the CVT 30 as represented by dotted line 118.

In the CVT 30, the actuator 62 receives the control signal through line 74. In response to the control signal, the actuator 62 moves the lever 54, connected to the actuator shaft 64, to control the ratio rate of the transmission 30. The lever 54 is connected to the actuator shaft 64 at one end and to the positionable pulley half 46 at the other end. At a point between the two ends, the lever 54 is pivotably connected to the valve rod 48. This arrangement provides position feedback of the pulley to the valve. As the actuator 62 moves the lever 54, valve 44, in response to the movement of the valve shaft 48, alters the hydraulic pressure in lines 36 and 47. Hydraulic pressure is provided to the valve through line 60 which is connected to a pressure source (not shown). As the pressure in lines 36 and 47 is altered, pulley halves 46 and 66 move, changing the ratio of the CVT 30 at a rate dependent upon the speed of the movement of the pulley halves. As pulley half 46 moves, the lever 54 moves repositioning the valve shaft 48, providing a means for the valve 44 to stop the positionable pulley halves 46 and 66 from moving.

The ratio rate of the CVT is controlled by controlling the speed of the movement of lever 54 by actuator 62. The faster the actuator 62 moves lever 54, the faster the ratio of the input and output shafts 40 and 92 changes.

The speed of the input shaft 40, also the speed of the engine 114 unless disengaged by a clutch (not shown), is sensed by sensor 38 and fed to the controller 14 through line 84. The speed of the output shaft 92 is sensed by sensor 58 and fed back to the controller through line 86.

Lines 84 and 86 are fed into counter 82 in the controller 14. The counter 82 counts the number of rotations of the input shaft 40 and the output shaft 92 separately and feeds the counts to the timer 80 through lines 76 and 78. With the information provided by the timer 80, the microcomputer can compute the rotational speeds of the input shaft 40 and the output shaft 92 of the CVT. The implementation of the present invention into the above described hardware will be further explained below.

Figure 2:
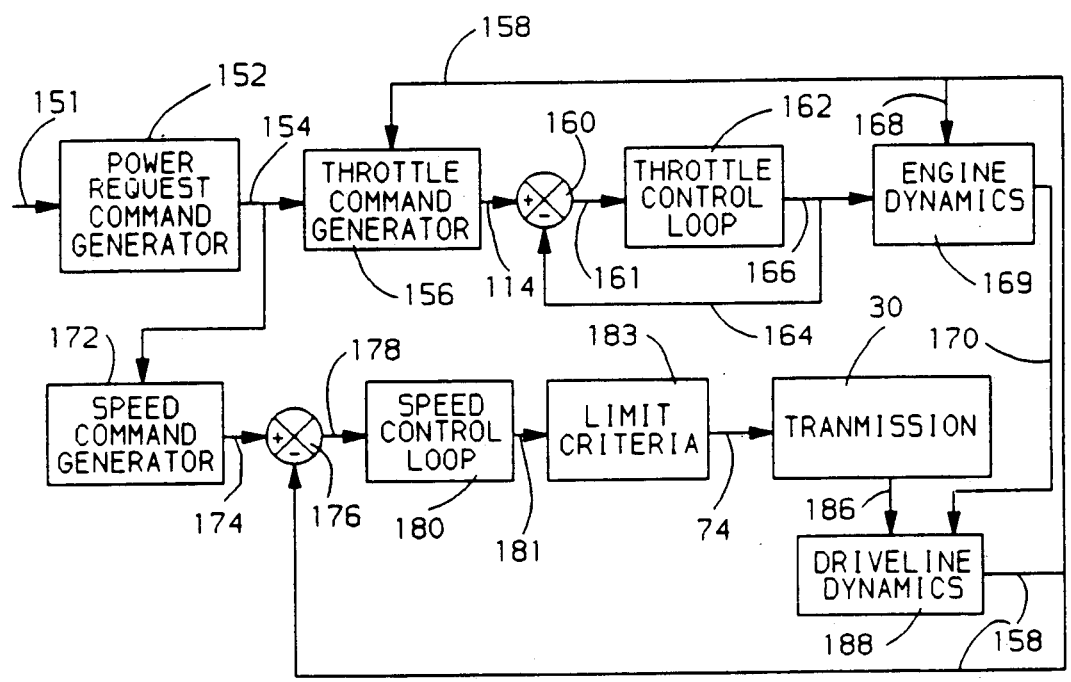
FIG. 2 is a controls diagram of the preferred implementation, showing throttle control and CVT ratio rate control.

A preferred implementation of the present invention can be understood with reference to the controls diagram in FIG. 2. The driver signal from the gas pedal (not shown) on line 151 is used as the input to a power request command generator 152. The power request command generator 152 may be as simple as a look-up table in the controller memory. The power request command generator 152 outputs a power command signal on line 154. The power command signal on line 154 is input into the throttle command generator 156 together with a measure of actual engine speed on line 158. The throttle command generator 156 generates, as a function of power command and actual input speed, a throttle position command on line 114. The throttle command generator 156 may be a two dimensional look-up table in computer memory. The throttle position command generated when the present invention is implemented is the throttle position required to give the engine the output power requested by the operator, if such output power is achievable through positioning the throttle. If the requested output power is not achievable, throttle command is for the wide open throttle position.

The throttle position command on line 114 is input into comparison block 160 which compares the actual throttle position on line 164 to the throttle position command and outputs a throttle error signal on line 161. The throttle error signal is input into throttle control loop 162 which controls the position of the throttle (not shown). The throttle control loop 162 may consist of a PID controller, but is not limited to such a controller. The actual throttle position, represented by line 166 controls the torque output of the engine, represented by block 169. The output power of the engine, represented by line 170, affects the vehicle driveline dynamics, represented by box 188.

The power command signal on line 154 is also input into the speed command generator 172, which outputs a speed command signal on line 174. The speed command generator 172 may consist of a look-up table in controller memory. The speed command signal on line 174 is input into the comparison block 176, which compares the speed command to actual engine speed on line 158. An error signal is output on line 178 and fed into the speed control loop 180, which may be a simple PID controller, but is not so limited. The speed control loop controls the ratio rate of the CVT by outputting a ratio rate command on line 181 which is limited, for reasons which will be explained below, at box 183, and input to the transmission 30 through line 74. Line 186, leading into box 188, illustrates that the ratio rate of the CVT affects the driveline dynamics of the vehicle controlling the actual engine speed represented by line 158. It shall be understood that the scope of the invention is not limited to use with the type of transmission control described above. The transmission control described above is the preferred transmission control for use of the present invention. Other types of CVT controllers with which the present invention can be utilized include ratio control controllers and other types of CVT ratio rate controllers.

Figure 3:
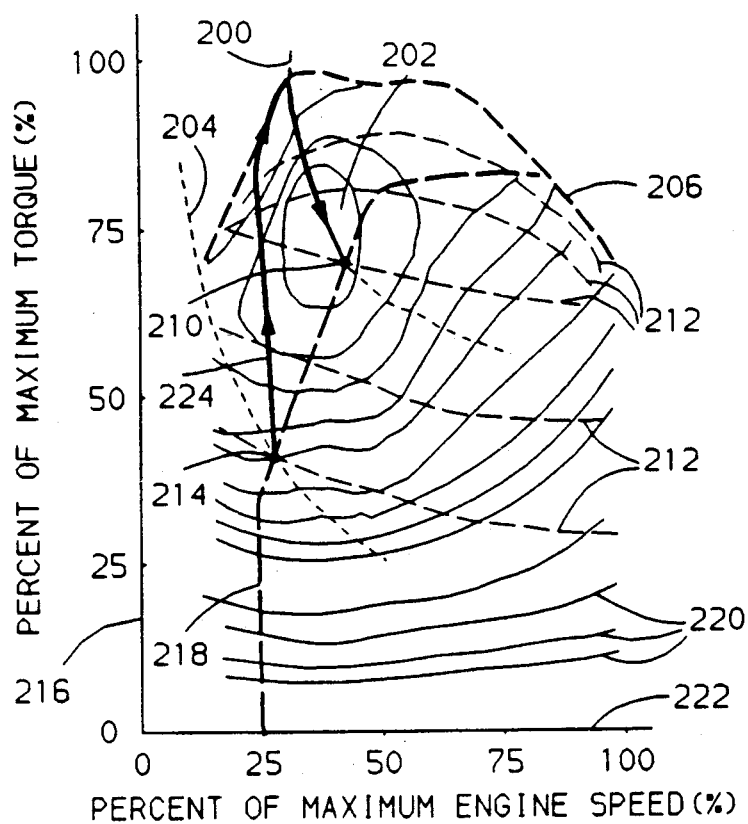
FIG. 3 is an engine map showing a typical response of the engine during acceleration when the present invention is implemented.

The effect that the subject invention has on the transient response of the engine can be better understood with reference to FIG. 3. In FIG. 3, the vertical axis 216 represents the percent maximum torque output of the engine. The horizontal axis 222 represents the percent maximum engine speed. The lines designated by the number 220 represent the constant efficiency lines of the engine. Island 202 is a high efficiency operating zone of the engine. The constant efficiency lines closer to the island 202 represent higher engine efficiencies. Lines 212 are constant throttle position lines. Line 206 is the wide-open throttle position line. Lines 200 and 204 are constant power lines. Line 218 is the chosen operating line of the engine.

The engine in a vehicle is desirably operated along an ideal operating line for highest engine efficiency. Line 218 is chosen to approximate such an ideal operating line. Because of the continuous nature of the CVT, any point along the operating line 218 can be achieved. The subject invention deals with the transient response of the engine, or the path the engine takes when it is between two points on the operating line.

The improvements described herein allow increased performance of the vehicle during periods of desired acceleration. For purposes of example, the engine is assumed to be operating at a first power level at point 214 on the operating line 218. If the operator depresses the gas pedal, indicating desired higher power from the engine, a point 210, corresponding to the higher power level, is determined. Point 210 is determined from the intersection of the operating line 218 and the constant power line 200 representing the desired power level. Once point 210 is determined, the engine speed, engine torque, and throttle position at that operating point are all easily determined, as from a look-up table of the engine map programmed into computer memory. The instantaneous engine speed and the power demand (indicated by amount of gas pedal depression) are used to compute the instantaneous desired engine torque (the intersection of the line representing the instantaneous engine speed and the constant power line representing the power demand). A throttle angle command is generated to be either the throttle position which would raise the engine output torque to the instantaneous desired engine torque, if that torque is achievable, or the wide open throttle position, if the instantaneous desired torque is not achievable. In the example illustrated in FIG. 3, the first desired throttle angle is for the wide open throttle position.

After the throttle angle command is determined, the controller opens the throttle to the position indicated by the angle command, here the wide open position. The controller also controls the ratio rate of the CVT to allow the engine to accelerate. Once a point along the constant power line 200, which is equal to the power level at desired operating point 210, is reached, the throttle is gradually closed. As this occurs, the instantaneous desired throttle position approaches the throttle position at operating point 210, moving the operating point of the engine to the desired point 210. Path 224 represents the transient response path of the engine during acceleration or increased power demand when this invention is implemented.

Although the above described engine control and response path is fairly efficient, it is not the most efficient response path of the engine. There may be times when a vehicle operator would desire conventional engine response for the sake of economy. The most preferred implementation of the present invention takes this into account, and provides a switch by which the operator can choose the response mode of the engine-CVT drivetrain. By moving the switch into one position, the operator chooses the performance mode that the present invention offers. By moving the switch into a second position, the operator chooses an economy mode of engine-CVT control. The operation of the economy mode is set forth below.

Figure 4:
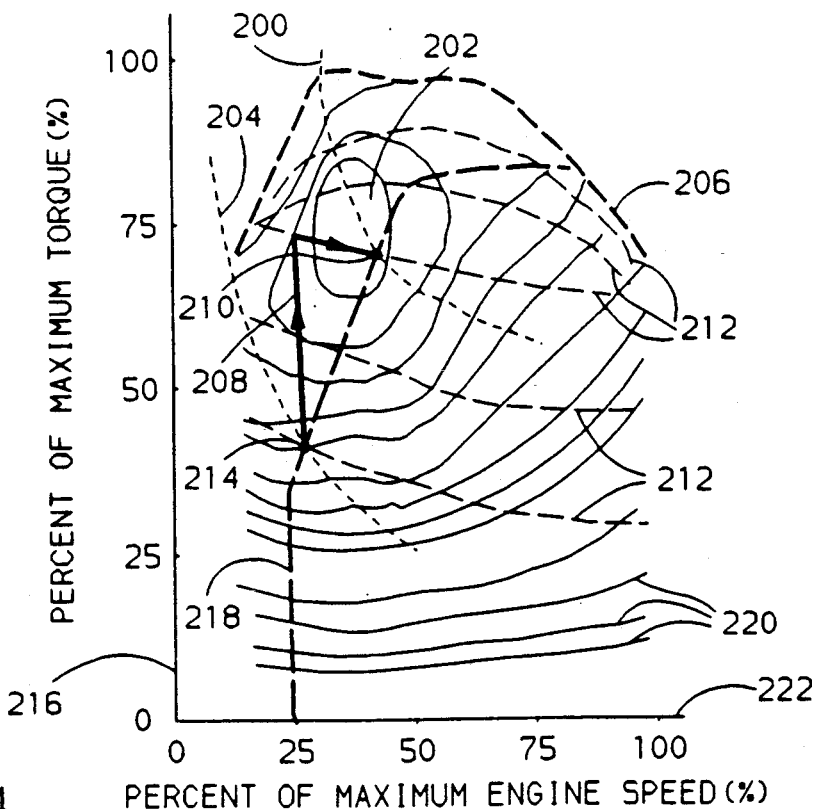
FIG. 4 is an engine map showing a second mode of operation of the engine when the increased performance offered by the present invention is not desired.

Path 208 in FIG. 4 illustrates the response of the engine in the economy mode. Again the vehicle is assumed to be operating at point 214 on the operating line 218. If the operator desires vehicle acceleration, point 210 is determined as explained above in the performance mode. Once point 210 is determined, the throttle position at that point can easily be determined. Once the throttle position at point 210 is determined, the controller moves the throttle to the desired throttle position increasing the engine output torque. The vertical portion of path 208 indicates the increased torque that occurs when the throttle is opened.

The controller also controls the ratio rate of the CVT to allow the engine speed to obtain the desired engine speed. Path 208 also indicates the part of the transient response controlled by the ratio rate of the CVT. To accelerate the engine, the ratio rate of the CVT is decreased, and to decelerate the engine, the ratio rate of the CVT is increased.

Although not illustrated in the figures, deceleration of the vehicle in both modes occurs in a manner similar to acceleration in the economy mode. The desired point along the operating line is determined. The throttle opening is then reduced to decrease the torque output of the engine to the torque output at the desired operating point, and the ratio rate of the CVT is increased to slow the engine speed to the engine speed at the desired operating point.

If a ratio rate controller is used to control the response of the CVT, as is preferred, it is important to note another feature of the most preferred implementation of the present invention. As explained in copending patent application U.S. Ser. No. 531,676, filed June 1, 1990, the ratio rate of the CVT should be limited to prevent vehicle deceleration during periods of desired acceleration and to prevent vehicle acceleration during periods of desired deceleration. Means to so limit the ratio rate of the CVT are fully set forth in the above described copending patent application. Because limiting the ratio rate is not an essential part of the present invention, it will not be further set forth here.

Figure 5:
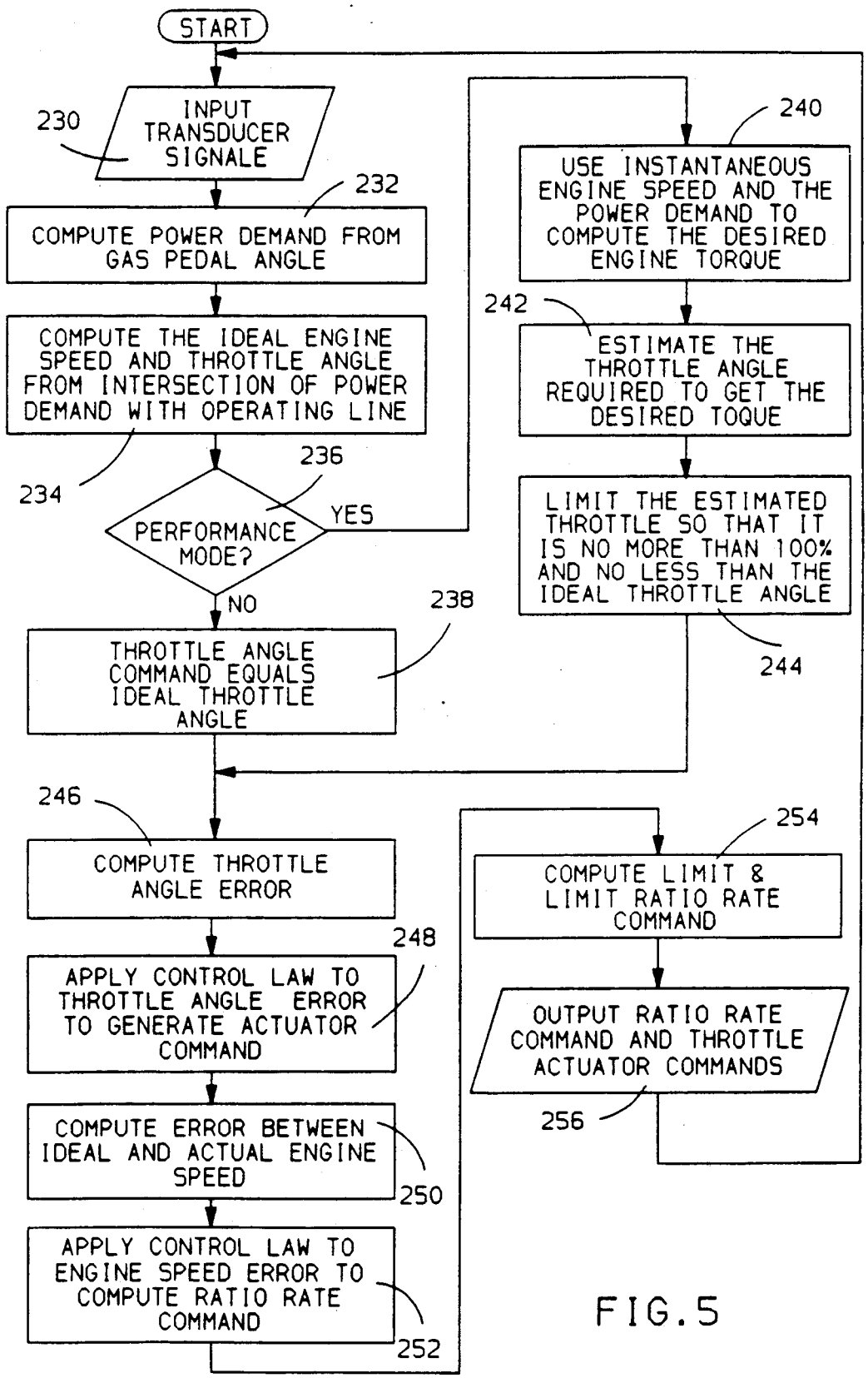
FIG. 5 is a flow diagram of a controller routine for operating the preferred implementation of the present invention.

An example of how a controller would implement the subject invention can be understood with reference to FIG. 5. The flow diagram in FIG. 5 illustrates a control routine of the preferred implementation of the subject invention. At input box 230, the controller receives input information of: gas pedal position, transmission shift position (Park, Neutral, Drive, Reverse), performance mode, engine speed, output shaft speed, and throttle position.

In box 232, the controller computes the operator power demand from the position of the gas pedal. At box 234, the controller computes the ideal engine speed and throttle angle from the intersection of the ideal operating line and the power line equal to the power demand. The controller next determines, at box 236, whether the operator has chosen performance or economy mode.

If the controller determines, at box 236, that the operator desires performance mode, then the throttle angle is computed as follows. The instantaneous engine speed and the power demand are used to compute the desired engine torque at box 240. At box 242, the controller estimates the throttle angle necessary to achieve the desired engine output torque. At box 244, the throttle angle command is computed so that it is no more than wide-open throttle and no less than the ideal throttle angle. At box 246, the throttle angle error is computed from the actual throttle angle and the throttle angle command. At box 248, a simple control routine is utilized to compute an actuator command.

The error between the ideal and actual engine speed is computed at box 250. At box 252, a simple control routine is utilized to compute a ratio rate command. A ratio rate limit is computed at box 254 and imposed on the ratio rate command. The ratio rate command and throttle actuator command are both output at box 256, the ratio rate command controlling the ratio rate of the CVT which controls the engine speed, and the throttle actuator command controlling the position of the throttle, controlling the engine output torque.

In economy mode, the throttle angle command is made equal to the ideal throttle angle at box 238. The controller then computes throttle angle error at box 246 and controls the throttle position and ratio rate as in the performance mode.

Although described with in combination with a ratio rate controller, the present invention is directed to an improved controller for obtaining increased performance from a vehicle with an engine-CVT drivetrain. The invention need not appear as in the above described example. Moreover, various modifications to the present invention will occur to those skilled in the art, and systems implementing those modifications may fall within the scope of the claims set forth below.

The embodiments of the invention in which an exclusive property or privilege is claimed are defined as follows:

1. An engine-CVT control system for a vehicle having an engine with various speeds, various output torques, including an instantaneous output torque, a throttle with various positions corresponding to various angles, including a wide-open position, means for positioning said throttle in response to a throttle angle command, and controller means controlling the throttle position command, the improvement wherein the controller means;

determines, from an operator demand, a demand signal indicative of a desired engine power level;

determines an ideal throttle angle signal in relation to said power demand signal and a chosen engine operating line;

determines a CVT ratio rate command in response to the demand signal;

determines a signal indicative of instantaneous engine speed;

determines, in relation to said power demand signal and the chosen engine operating line, a signal indicative of desired engine torque;

determines the throttle angle command in response to said desired engine torque signal wherein the throttle angle command corresponds to a throttle angle which would raise the instantaneous engine output torque to the desired engine torque, if achievable;

limits said throttle angle command to a command indicating wide-open throttle if said desired engine torque is not achievable; and limits said throttle angle command to the ideal throttle angle signal if said throttle angle command is less than said ideal throttle angle signal;

and applies the throttle angle command and CVT ratio rate command to the throttle and CVT.

2. The improvement in claim 1 wherein the control system determines the CVT ratio rate command also is response to engine speed.

3. The improvement in claim 1 also including a second mode of operation wherein said controller means (1) develops a power demand signal in relation to operator demand, and (2) develops the throttle angle command in response to said power demand signal, whereby the control system can position the throttle to a desired throttle position, providing economical performance of the vehicle during periods of acceleration and deceleration.

4. The improvement in claim 3 wherein an operator command determines whether the controller operates in said first mode or said second mode.

5. The improvement in claim 3 wherein the control system determines the CVT ratio rate command also in response to engine speed.

6. The improvement in claim 4 wherein the control system determines the CVT ratio rate command also in response to engine speed.

7. In an engine-CVT control system, including a controller means which controls a throttle with various positions including a wide-open position, for a vehicle with an engine with various output power and torque levels, an improved method of operation wherein the controller means;

determines a CVT ratio rate command in response to engine speed and operator demand, and in response to (i) operator demand indicating a desired increased engine torque level and (ii) a chosen engine operating line, (1) positions the throttle to provide engine output torque equal to said desired engine output torque level if said output torque level is achievable by positioning said throttle, (2) positions the throttle in the wide-open throttle position if the engine torque level at said wide-open throttle position is not greater than said desired torque level, and (3) limits the throttle position to a position no less than an ideal throttle position determined in response to operator demand.

8. An engine-CVT control system for a vehicle having a CVT with a ratio control element positionable to establish various speed ratios between input and output shafts of the CVT, the ratio being variable at various ratio rates, the vehicle also having a depressable gas pedal, an engine with various output power levels, various output torques, including an instantaneous engine output torque, various speeds including an instantaneous engine speed, and various operating points, a throttle with various positions including a wide-open position, means for positioning said throttle in response to a throttle position command, means for controlling the ratio rate of the CVT in response to a ratio rate command, and controller means for controlling the throttle position command and the ratio rate command, the improvement wherein the controller means;

in a first mode of operation, in response to operator depression of the gas pedal indicating a desired increased output power level from the engine, determines a target point on a chosen engine operating line for achieving the increased power level, thereby defining a target engine speed and a target engine throttle position;

determines an instantaneous desired engine torque in response to the chosen engine operating line and the desired output power level; and determines (1) a throttle position command corresponding to the throttle position which would raise the instantaneous engine output torque to the desired engine output torque, if achievable, and (2) a ratio rate command in relation to the difference between the instantaneous and target engine speeds, whereby the engine speed and throttle position approach the target engine speed and target throttle position in a manner achieving improved transient performance of the engine.

9. The improvement in claim 8 wherein, in a second mode of operation, the controller means;

develops the throttle position command in relation to the target throttle position, whereby the engine speed and throttle position approach the target engine speed and throttle position in a manner achieving economical transient response of the engine.

10. The improvement in claim 9 including means for switching between the first and second modes of operation in response to operator command.

* * * * *